United States Patent
Vargas Garcia et al.

(10) Patent No.: US 10,011,234 B1
(45) Date of Patent: Jul. 3, 2018

(54) VEHICLE GARMENT HOOK ASSEMBLY

(71) Applicant: Ford Global Technologies, LLC, Dearborn, MI (US)

(72) Inventors: Carmen Frida Vargas Garcia, Cuautitlan Izcalli (MX); Luis Adrian Tena Han, Tlalnepantla de Baz (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/597,538

(22) Filed: May 17, 2017

(51) Int. Cl.
*B60R 7/10* (2006.01)
*B60R 11/00* (2006.01)

(52) U.S. Cl.
CPC .......... *B60R 7/10* (2013.01); *B60R 2011/0021* (2013.01); *B60R 2011/0084* (2013.01)

(58) Field of Classification Search
CPC ............... B60R 7/10; B60R 2011/0021; B60R 2011/0084
See application file for complete search history.

(56) References Cited

U.S. PATENT DOCUMENTS

| | | | | |
|---|---|---|---|---|
| 223,963 A * | 1/1880 | Taylor | ............... | A47G 7/045 211/96 |
| 1,651,969 A * | 12/1927 | Saxton | ............... | B60R 7/10 211/96 |
| 2,565,958 A * | 8/1951 | Foster, Jr. | ............... | B60R 7/10 211/104 |
| 2,602,622 A * | 7/1952 | Smith | ............... | A47G 25/065 248/291.1 |
| 2,706,049 A | 4/1955 | Andrews | | |
| 3,082,990 A * | 3/1963 | Nelson | ............... | B63B 35/816 248/308 |
| 4,787,590 A | 11/1988 | Melvin | | |
| 4,863,081 A * | 9/1989 | Gabbert | ............... | B60R 7/10 211/118 |
| 5,366,127 A * | 11/1994 | Heinz | ............... | B60R 7/10 16/284 |
| 5,769,294 A * | 6/1998 | Heinz | ............... | B60R 7/02 224/544 |
| 7,118,082 B2 | 10/2006 | Brnjac | | |
| 7,669,822 B2 * | 3/2010 | Kluge | ............... | F16B 45/02 211/18 |
| 9,561,755 B2 | 2/2017 | Huelke et al. | | |

* cited by examiner

*Primary Examiner* — Corey Skurdal
(74) *Attorney, Agent, or Firm* — Vichit Chea; Price Heneveld LLP

(57) ABSTRACT

A vehicle garment hanger assembly is provided. The vehicle garment hanger assembly includes a housing mounted on a vehicle, a fixed garment hanger extending forward of the housing, a first retractable garment hanger connected to the housing and rotatable to a deployed position, and a second retractable garment hanger connected to the housing and rotatable to a deployed position.

16 Claims, 8 Drawing Sheets

VEHICLE GARMENT HOOK ASSEMBLY

FIELD OF THE INVENTION

The present invention generally relates to garment hangers, such as hooks, and more particularly relates to deployable garment hangers for a vehicle interior.

BACKGROUND OF THE INVENTION

Automotive vehicles typically include one or more coat or garment hangers, typically in the form of hooks, mounted in the passenger compartment interior, such as within the headliner to permit clothing, clothing hangers, and the like to be hung from the hanger. Typically, garment hangers are fixed or stationary or may be retractable and deployed to allow a single hook for access. It is desirable to provide for a hanger assembly that allows for enhanced hanger options for passengers onboard a vehicle.

SUMMARY OF THE INVENTION

According to one aspect of the present invention, a vehicle garment hanger assembly is provided. The vehicle garment hanger assembly includes a housing mounted on a vehicle, and a fixed garment hanger extending forward of the housing. The vehicle garment hanger assembly also includes a first rotatable garment hanger connected to the housing and rotatable between deployed and retracted positions, and a second rotatable garment hanger connected to the housing and rotatable between deployed and retracted positions.

Embodiments of the first aspect of the invention can include any one or a combination of the following features:
the first and second rotatable garment hangers rotate laterally between the deployed and retracted positions;
the first and second rotatable garment hangers rotate in opposite lateral directions;
the first rotatable garment hanger rotates about a first axis extending into the housing and the second rotatable garment hanger rotates about a second axis extending into the housing, and wherein the second axis is parallel with the first axis;
the first and second rotatable garment hangers each rotate about respective first and second pivots;
the first and second rotatable garment hangers rotate forward to the deployed position and upward to the retracted position;
each of the first and second rotatable garment hangers is coupled to respective springs to bias the first and second retractable garment hangers into one of the deployed and retracted positions;
the first and second garment hangers each comprises a pivoting arm having a hook;
the housing is mounted to a trim component; and
the trim component comprises a headliner.

According to another aspect of the present invention, a vehicle garment hanger assembly is provided. The vehicle garment hanger assembly includes a housing mounted on a vehicle, a first sideways-rotatable garment hanger connected to the housing and rotatable laterally between deployed and retracted positions, and a second sideways-rotatable garment hanger connected to the housing and rotatable laterally between deployed and retracted positions.

Embodiments of the second aspect of the invention can include any one or a combination of the following features:
the hanger assembly further has a fixed garment hanger extending forward of the housing;
the first and second sideways-rotatable garment hangers rotate in opposite lateral directions;
the first sideways-rotatable garment hanger rotates about a first axis extending into the housing and the second sideways-rotatable garment hanger rotates about a second axis extending into the housing, and wherein the second axis is parallel with the first axis;
the first and second sideways-rotatable garment hangers rotate about respective first and second pivots;
the first and second sideways-rotatable garment hangers each comprises a pivoting arm having a hook;
the housing is mounted to a trim component; and
the trim component comprises a headliner.

According to yet another aspect of the present invention, a vehicle garment hanger assembly. The vehicle garment hanger assembly includes a housing mounted to a trim component on a vehicle, and a fixed garment hanger extending forward of the housing. The vehicle garment hanger assembly also includes a first sideways-rotatable garment hanger connected to the housing and rotatable laterally on a first side between deployed and retracted positions, and a second sideways-rotatable garment hanger connected to the housing and rotatable laterally on an opposite second side between deployed and retracted positions.

The embodiment of the third aspect of the invention can include any one or a combination of the following feature:
the first sideways-rotatable garment hanger rotates about a first axis extending into the housing and the second sideways-rotatable garment hanger rotates about a second axis extending into the housing, and wherein the second axis is parallel with the first axis.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 2:
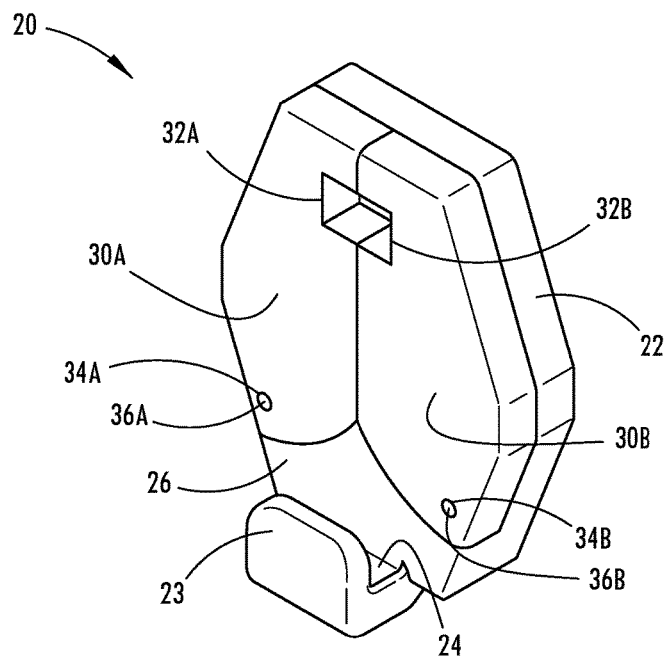
FIG. 2 is an enlarged perspective view of a garment hanger assembly with rotatable hangers shown in the retracted stored position, according to one embodiment.
Figure 7:
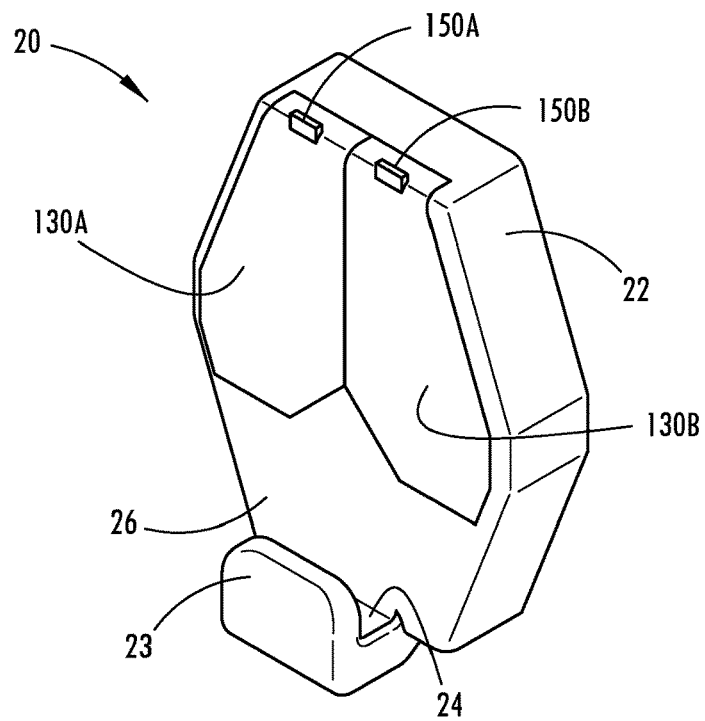
FIG. 7 is a front perspective view of a garment hanger assembly with rotatable hangers shown in the retracted stored position, according to another embodiment.
Figure 8:
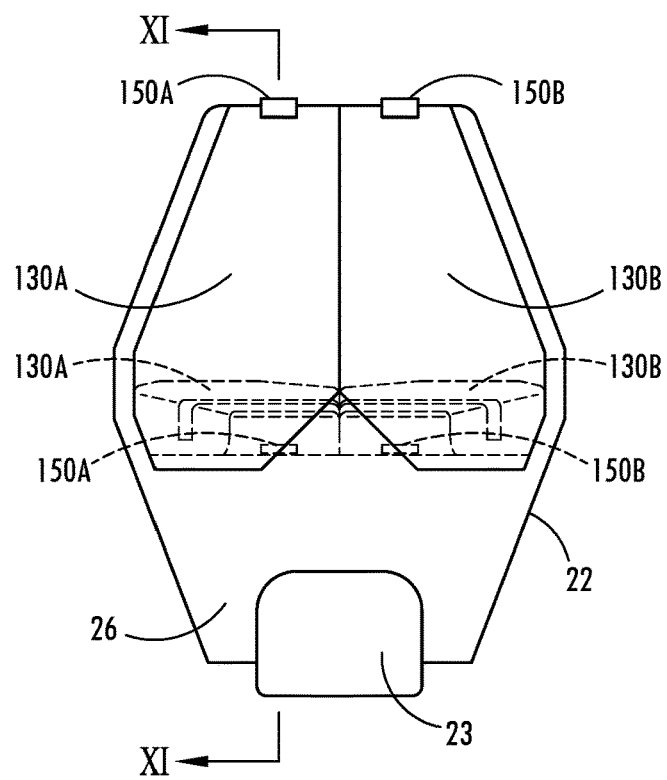
FIG. 8 is a front view of the garment hanger assembly of FIG. 7 showing the rotatable hangers in the retracted stored position in solid lines and deployed use positions in dashed lines.
Figure 9:
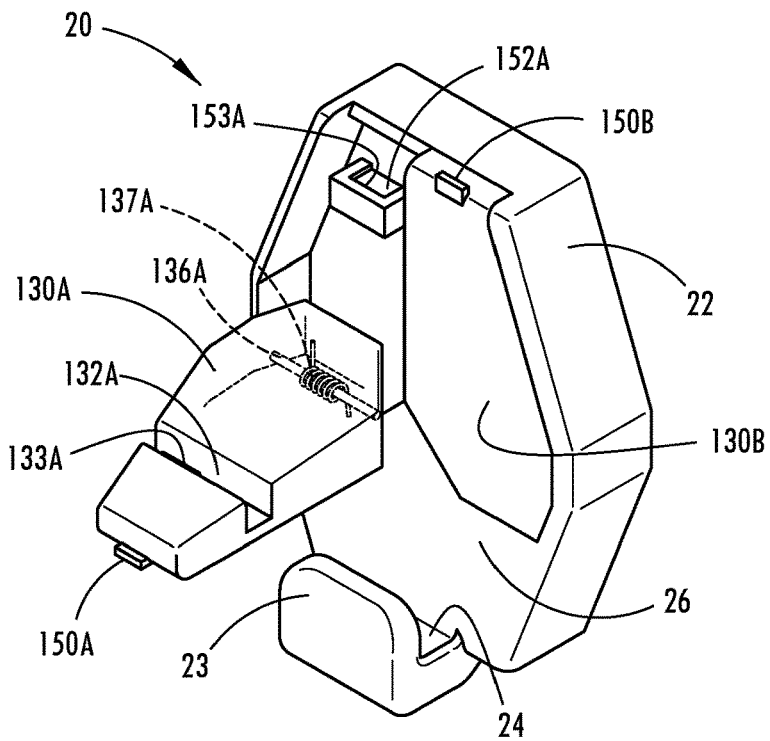
FIG. 9 is a front perspective view of the garment hook assembly of FIG. 7 with one of the rotatable hangers shown in the deployed use position.
Figure 10:
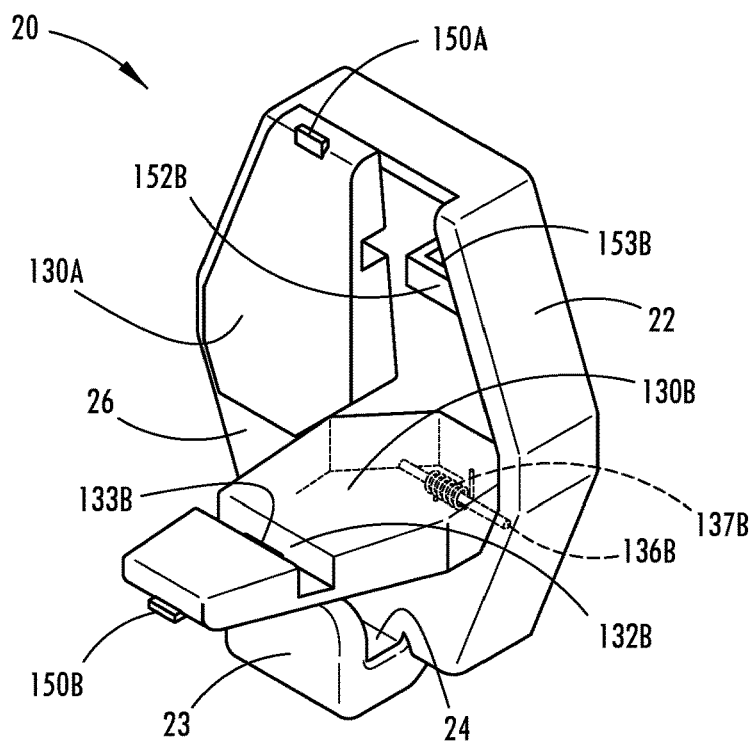
FIG. 10 is a front perspective view of the garment hook assembly of FIG. 7 with the other of the rotatable hangers shown in the deployed use position.

For purposes of description herein, the terms "upper," "lower," "right," "left," "rear," "front," "vertical," "horizontal," "interior," "exterior," and derivatives thereof shall relate to the garment hanger assembly as oriented in FIGS. 2 and 7. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
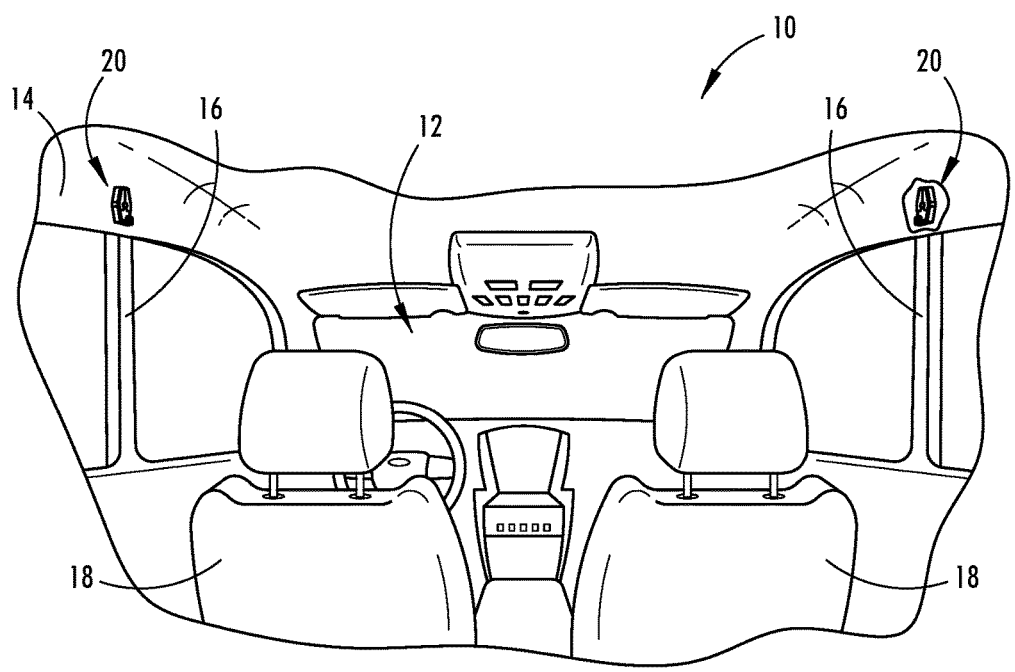
FIG. 1 is a perspective view of a vehicle cabin having garment hanger assemblies disposed therein, according to one embodiment.

Referring to FIG. 1, the cabin interior 12 of a wheeled automotive or motor vehicle 10 is generally illustrated configured for passenger seating and having garment hanger assemblies designated as reference numeral 20. The cabin interior 12 of the vehicle 10 is shown having a headliner 14, side pillars 16, and passenger seats 18. The vehicle passenger seats 18, side pillars 16 and headliner 14 may be configured having trim components. One or more garment hanger assemblies 20 may be assembled in the vehicle 10 to any of the headliner 14 as shown, the side pillars 16, and vehicle seats 18 as well as other locations on the vehicle 10 and on trim components associated therewith.

In the illustrated embodiment, a pair of garment hanger assemblies 20 are shown assembled to a trim component shown as the headliner 14, however, the garment hanger assemblies 20 may be assembled to other trim components, including trim components on the side pillars 16, seats 18, interior panels, and the like, according to other embodiments. The headliner 14 may be a formed and molded headliner for mounting to the interior of the roof structure of the vehicle 10, so as to provide an aesthetically pleasing appearance for the interior 12 of the vehicle 10. The headliner 14 is shaped to conform to the roof structure and may include a plurality of contours and apertures for mounting various overhead components, such as sun visors, overhead consoles, grab handles, lights, and one or more garment hanger assemblies 20.

Referring to FIGS. 2-6, the garment hanger assembly 20 is illustrated having a pair of rotatable garment hangers 30A and 30B that rotate to the lateral left and right sides in opposing directions, according to one embodiment. The garment hanger assembly 20 is shown having a housing 22 that generally extends vertically and a hook portion 24 that extends forward and upward to form a fixed garment hanger 23. The fixed garment hanger 23 is formed from the hook portion 24 extending forward of the base 26 of housing 22. Housing 22 may be configured to receive fasteners (e.g., screws) or adhesive on the rear side for connecting the garment hanger assembly 20 to a vehicle interior trim component, such as a component shown as headliner 14. The fixed garment hanger 22 is formed extending from the base 26 of housing 22 in a generally J-shape to form a hook and extends forward by a sufficient distance to allow the fixed hanger 23 to receive a hanging item such as a piece of clothing, a hanger, a purse or other hangable item.

Figure 3:
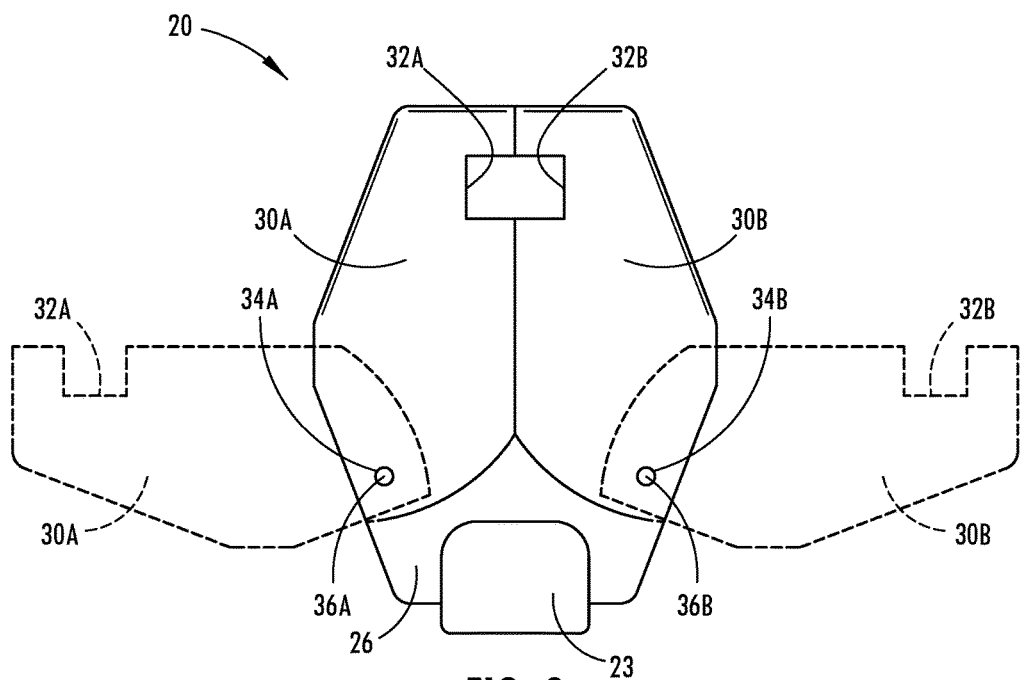
FIG. 3 is a front view of the garment hanger assembly of FIG. 2 illustrating the rotatable hangers shown in deployed use positions in dashed lines and stored positions in solid lines.
Figure 4:
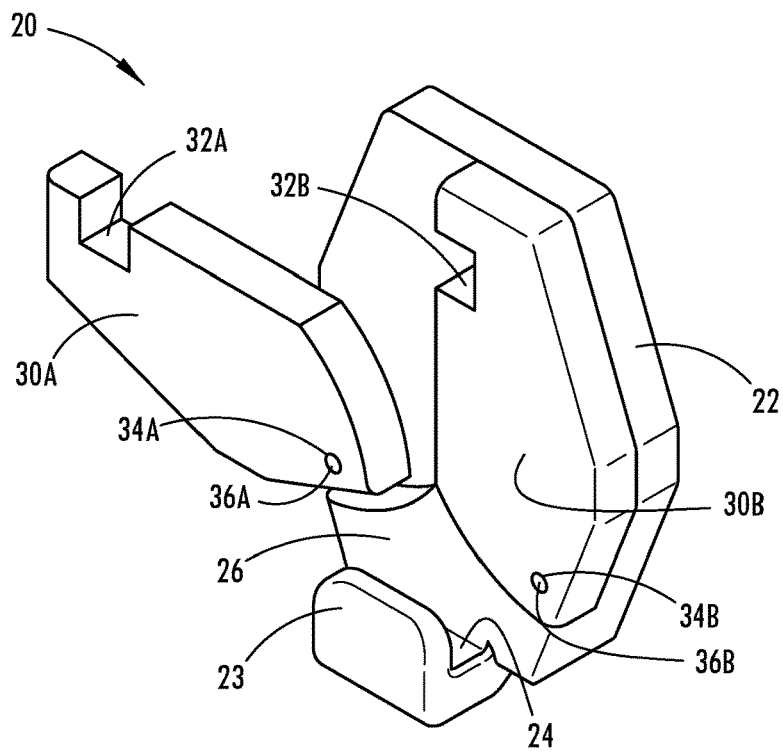
FIG. 4 is a front perspective view of the garment hanger assembly of FIG. 2 showing one of the rotatable hangers in the deployed use position.
Figure 5:
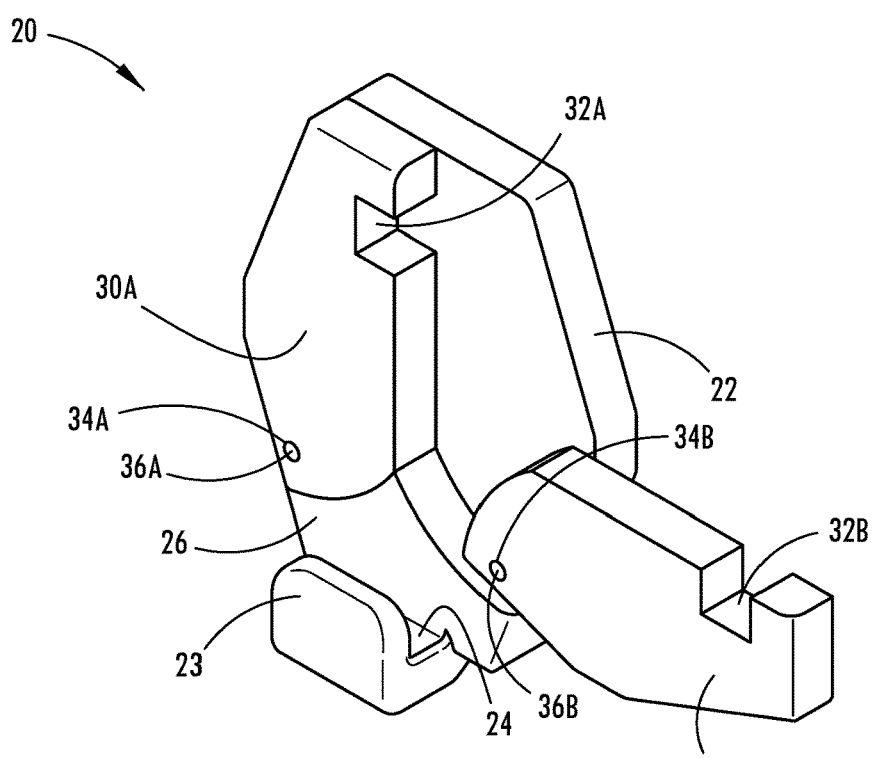
FIG. 5 is a front perspective view of the garment hanger assembly of FIG. 2 with the other of the rotatable hangers shown in the use position.

The vehicle garment hanger assembly 20 also includes a pair of rotatable garment hangers shown as a first rotatable garment hanger 30A and a second rotatable garment hanger 30B. Each of the first and second rotatable garment hangers 30A and 30B are movable between a deployed position that serves as the use position and retracted position that serve as the stored position. In the embodiment shown in FIGS. 2-6, the first rotatable garment hanger 30A is movable between an upright retracted position as seen in FIGS. 2 and 5 and is sideways-rotatable laterally in a first direction towards the left side to a downward extended deployed position as shown in FIGS. 3 and 4. The first rotatable garment hanger 30A pivots between the deployed and retracted positions about a first pivot pin 36A that extends along a first axis parallel to the Z-axis extending into the housing 22. The first rotatable garment hanger 30A has a pivoting arm and a hook portion 32A shown formed as a U-shaped notch for providing a garment hanger when in the deployed position to receive an item to be hung thereon.

The second rotatable hanger 30B may be located in the upright retracted position as shown in FIGS. 2 and 4. The second rotatable hanger 30B may be sideways rotated laterally towards the right side in a second direction opposite to the first direction to a downward extended deployed position as shown in FIGS. 3 and 5. The second rotatable garment hanger 30B rotates about a second pivot pin 36B that extends along a second axis that is parallel to the first axis and the Z-axis extending into the housing 22. The second rotatable garment hanger 30B has a pivoting arm and a hook portion 32B shown formed as a U-shaped notch for forming the garment hanger when in the deployed position to receive an item to be hung thereon.

Each of the rotatable garment hangers 30A and 30B may be independently moved between the deployed and retracted positions such that both of the first and second rotatable hangers 30A and 30B may be in the retracted position, and thus not usable as hangers, or in the deployed position and thus useable as hangers to provide up to two additional hangers. The rotatable garment hangers 30A and 30B may be individually actuated by a user to move to the deployed position such that only one or both of the rotatable garment hangers 30A and 30B are available for use as hangers.

The vehicle garment hanger assembly 20 thereby provides for a fixed garment hanger 22 that extends generally forward and two rotatable garment hangers 30A and 30B that are individually actuated to deploy to opposite sides to deployed positions to provide up to three separate hangers for hanging articles within the cabin of the vehicle 10. Thus, a user may determine how many hangers are necessary and may easily deploy one or both of the rotatable garment hangers 30A and 30B as needed to provide additional hanger capacity. This provides for enhanced functionality of the garment hanger assembly 20 with more hanger options for passengers within the vehicle 10.

Figure 6:
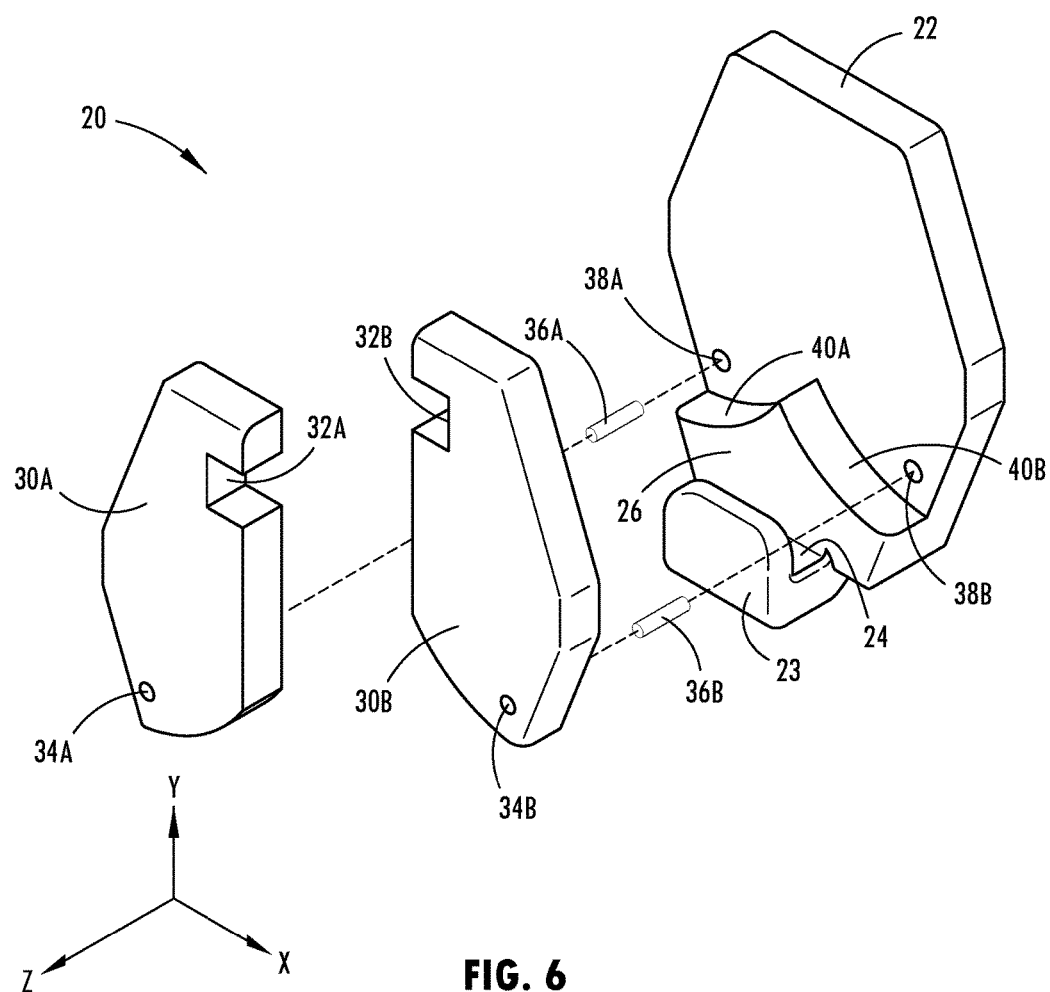
FIG. 6 is an exploded view of the garment hanger assembly of FIG. 2.

Referring to FIG. 6, the vehicle garment hanger assembly 20 is illustrated further showing the first and second pivot pins 36A and 36B and the pin connections to the rotatable garment hangers 30A and 30B and housing 22. The first pivot pin 36A extends through a hole 34A extending into the first rotatable garment hanger 30A and into a hole 38A in the front side of the housing 22. Thus, the holes 34A and 38A receive and hold the first pivot pin 36A in place and permit the first rotatable hanger 30A to pivot or rotate about the first pivot pin 36A between the deployed and retracted positions. Likewise, the second pivot pin 36B extends through hole 34B in the second rotatable garment hanger 30B and into hole 38B in the front surface of housing 22 to allow the second rotatable hanger 30B to pivot or rotate about the second pivot pin 30B laterally between the deployed and retracted positions.

The housing 22 is further illustrated with base 26 extending forward and having a contoured curved surface 40A that conforms to the shape of the bottom surface of the first rotatable garment hanger 30A and a second curved shaped surface 40B that is shaped to conform to the bottom surface of the second rotatable garment hanger 30B. In the retracted positions, the bottom surfaces of the first and second rotatable hangers 30A and 30B are substantially flush with the respective first and second curved shaped surfaces 40A and 40B.

To move the first and second rotatable hangers 30A and 30B from the retracted position to the deployed position, a user may engage the U-shaped hanger portions 32A and 32B with a finger or other object and apply force to move and thereby rotate the respective first and second rotatable garment hangers 30A and 30B left or right. The first and second hangers 30A and 30B may rotate approximately ninety degrees (90°) between the deployed and retracted positions and curved surfaces 40a and 40b of base 26 may serve as an end limit of rotation in the deployed position. To move and thereby pivot the first and second hangers 30A and 30B to the retracted positions, a force is applied in the opposite direction.

Referring to FIGS. 7-13, a vehicle garment hanger assembly 20 is illustrated having first and second forward rotatable garment hangers 130A and 130B, according to another embodiment. In this embodiment, the garment hanger assembly 20 includes a housing 22 that may be connected to a vehicle component, such as a headliner or other trim component on the vehicle 10. The assembly 20 likewise includes a forward projecting fixed hanger 23 formed in the base 26 of housing 22 to allow articles to be hung thereon as described above.

In this embodiment, each of the first and second rotatable garment hangers 130A and 130B are each configured to pivot between a deployed position which is a forward use position and a retracted position which is an upward stored position. The first rotatable garment hanger 130A is shown pivoted forward and downward to the use or deployed position in FIG. 9 and is shown in the stored or retracted position in FIG. 8. The second rotatable garment hanger 130B is shown in the pivoted forward deployed position in FIG. 10 and the upright retracted position in FIG. 8. Each of the first and second rotatable garment hangers 130A and 130B thereby rotates about a common horizontal X-axis between the forward deployed position and upright retracted position. The first and second rotatable garment hangers 130A and 130B may be independently actuated between the deployed and retracted positions, such that one or both or neither of the rotatable garment hangers 130A and 130B are in the deployed position for use in receiving an article to be hung.

Each of the first and second rotatable garment hangers 130A and 130B has an upward extending release tab 150A or 150B for allowing a user to engage the top end of the corresponding rotatable garment hanger and apply force to pivot the corresponding hanger downward to the forward deployed position or to return it back upward to the retracted position. The release tabs 150A and 150B are shown as upward protruding members that allow for frictional engagement or contact with a user's finger. In addition, a pair of frictional male members 152A or 152B are shown formed on the front surface of housing 22 for receiving and engaging the respective U-shaped slots forming hook portions 132A and 132B on respective rotatable garment hangers 130A and 130B to hold and maintain the rotatable garment hangers 130A and 130B in the upright retracted positions due to friction between the male members 152A and 152B and corresponding U-shaped slots for hook portions 132A and 132B. Additionally, to enhance the holding closure of the rotatable garment hangers 130A and 130B in the retracted positions, hook portions 132A and 132B may have an inward protruding lip 133A and 133B that engages a corresponding upward protruding edge 153A and 153B on respective male members 152A and 152B. As such, the rotatable garment hangers 130A and 130B are maintained by friction in the upright position when not in use.

The first and second garment hangers 130A and 130B may rotate approximately ninety degrees (90°) between the deployed and retracted positions. Forward rotation may be limited by the garment hangers 130A and 130B contacting the base in the forwardmost position and supporting the hanger load.

Figure 11:
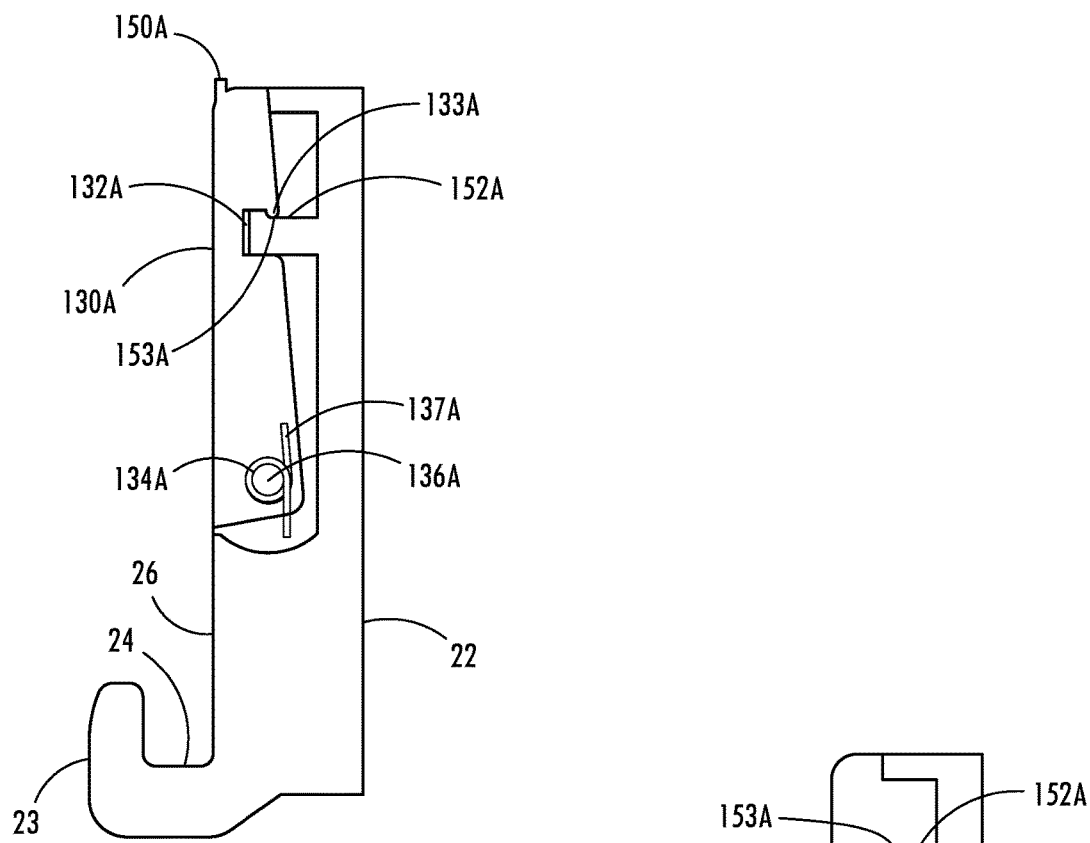
FIG. 11 is a cross-sectional view taken through line XI-XI of FIG. 8 with one of the rotatable hangers shown in the retracted stored position.
Figure 12:
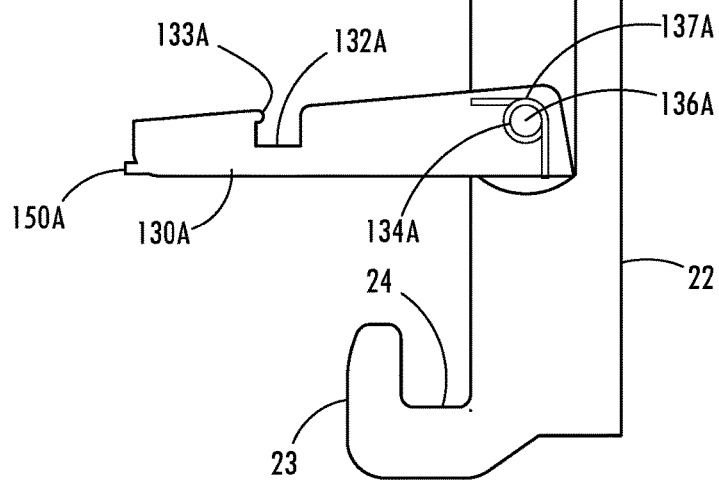
FIG. 12 is a cross-sectional view of the garment hanger assembly of FIG. 7 showing one of the rotatable hangers in the deployed use position.
Figure 13:
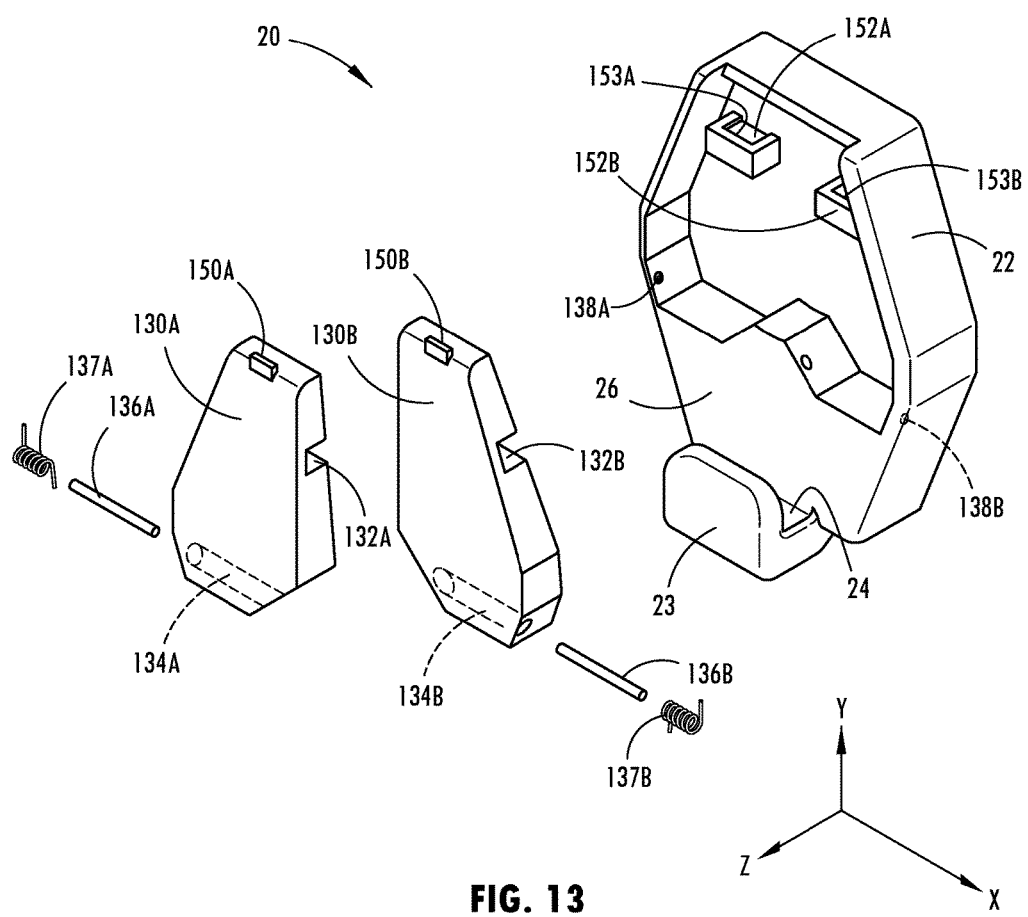
FIG. 13 is an exploded view of the garment hanger assembly of FIG. 7.

As seen in FIGS. 11-13, the vehicle garment hanger assembly 20 employs a first pivot pin 136A aligned in the lateral X-axis direction to allow the first rotatable garment hanger 130A to pivot forward and upward. The garment hanger assembly 20 also employs a second pivot pin 136B aligned in the lateral X-axis direction to allow the second rotatable hanger 130B to pivot forward and upward. The pivot pins 136A and 136B are shown extending through corresponding holes 134A and 134B in the first and second respective retractable garment hangers 130A and 130B. First pivot pin 136A further extends within hole 138A and a lateral side wall of the housing 26 on the left side and second pivot pin 136B extends into hole 138B on the opposite lateral side wall of the housing 22. Further, a first spring 137A may be employed to maintain the rotatable garment hanger 130A in one of the deployed and retracted positions. A second spring 137B may be used to maintain the second rotatable garment hanger 130B in one of the deployed and retracted positions. The first and second springs 137A and 137B are shown in FIG. 13 and may include torsion springs that may extend into holes 134A and 134B and surround the pivot pins 136A and 1368B. In the embodiment shown, the springs 137A and 137B bias the respective rotatable garment hangers 130A and 130B to the deployed position.

Accordingly, the vehicle garment hanger assembly 20 advantageously provides for multiple retractable hangers within the cabin of a vehicle. The number of hangers employed may be selected by a user and easily manipulated to provide more or less hangers.

It will be understood by one having ordinary skill in the art that construction of the described attachment system and other components is not limited to any specific material. Other exemplary embodiments of the invention disclosed herein may be formed from a wide variety of materials, unless described otherwise herein.

It is also important to note that the construction and arrangement of the elements of the garment hook and guard mount assembly as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle garment hanger assembly comprising:
a housing mounted on a vehicle;
a fixed garment hanger extending forward of the housing;
a first rotatable garment hanger connected to the housing and rotatable between deployed and retracted positions; and
a second rotatable garment hanger connected to the housing and rotatable between deployed and retracted positions, wherein the first and second rotatable garment hangers rotate in opposite lateral directions about pivot axes perpendicular to the housing.

2. The garment hanger assembly of claim 1, wherein the first rotatable garment hanger rotates about a first axis extending into the housing and the second rotatable garment hanger rotates about a second axis extending into the housing, and wherein the second axis is parallel with the first axis.

3. The garment hanger assembly of claim 1, wherein the first and second rotatable garment hangers each rotate about respective first and second pivots.

4. The garment hanger assembly of claim 1, wherein each of the first and second rotatable garment hangers is coupled to respective springs to bias the first and second retractable garment hangers into one of the deployed and retracted positions.

5. The garment hanger assembly of claim 1, wherein the first and second garment hangers each comprises a pivoting arm having a hook.

6. The garment hanger assembly of claim 1, wherein the housing is mounted to a trim component.

7. The garment hanger assembly of claim 1, wherein the trim component comprises a headliner.

8. A vehicle garment hanger assembly comprising:
a housing mounted on a vehicle;
a first sideways-rotatable garment hanger connected to the housing and rotatable laterally between deployed and retracted positions; and
a second sideways-rotatable garment hanger connected to the housing and rotatable laterally between deployed and retracted positions, wherein first and second sideways-rotatable garment hangers rotate in opposite lateral directions about axes perpendicular to the housing.

9. The garment hanger assembly of claim 8 further comprising a fixed garment hanger extending forward of the housing.

10. The garment hanger assembly of claim 8, wherein the first sideways-rotatable garment hanger rotates about a first axis extending into the housing and the second sideways-rotatable garment hanger rotates about a second axis extending into the housing, and wherein the second axis is parallel with the first axis.

11. The garment hanger assembly of claim 8, wherein the first and second sideways-rotatable garment hangers rotate about respective first and second pivots.

12. The garment hanger assembly of claim 8, wherein the first and second sideways-rotatable garment hangers each comprises a pivoting arm having a hook.

13. The garment hanger assembly of claim 8, wherein the housing is mounted to a trim component.

14. The garment hanger assembly of claim 8, wherein the trim component comprises a headliner.

15. A vehicle garment hanger assembly comprising:
a housing mounted to a trim component on a vehicle;
a fixed garment hanger extending forward of the housing;
a first sideways-rotatable garment hanger connected to the housing and rotatable laterally on a first side between deployed and retracted positions; and
a second sideways-rotatable garment hanger connected to the housing and rotatable laterally on an opposite second side between deployed and retracted positions, wherein first and second sideways-rotatable garment hangers rotate in opposite lateral directions about pivot axes perpendicular to the housing.

16. The garment hanger assembly of claim 15, wherein the first sideways-rotatable garment hanger rotates about a first axis extending into the housing and the second sideways-rotatable garment hanger rotates about a second axis extending into the housing, and wherein the second axis is parallel with the first axis.

* * * * *

UNITED STATES PATENT AND TRADEMARK OFFICE
CERTIFICATE OF CORRECTION

PATENT NO. : 10,011,234 B1
APPLICATION NO. : 15/597538
DATED : July 3, 2018
INVENTOR(S) : Vargas Garcia et al.

Page 1 of 1

It is certified that error appears in the above-identified patent and that said Letters Patent is hereby corrected as shown below:

In the Claims

Column 8:
Claim 8, Line 17;
After "about" insert --pivot--.

Signed and Sealed this
Fourth Day of September, 2018

Andrei Iancu
*Director of the United States Patent and Trademark Office*